US012125602B2

(12) United States Patent
Hwang et al.

(10) Patent No.: US 12,125,602 B2
(45) Date of Patent: Oct. 22, 2024

(54) METHOD FOR DECOMMISSIONING NUCLEAR FACILITY

(71) Applicant: KOREA HYDRO & NUCLEAR POWER CO., LTD., Gyeongju-si (KR)

(72) Inventors: Young Hwan Hwang, Daejeon (KR); Seok-Ju Hwang, Daejeon (KR); Mi-Hyun Lee, Daejeon (KR); Cheon-Woo Kim, Daejeon (KR)

(73) Assignee: KOREA HYDRO & NUCLEAR POWER CO., LTD., Gyeongju-si (KR)

(*) Notice: Subject to any disclaimer, the term of this patent is extended or adjusted under 35 U.S.C. 154(b) by 334 days.

(21) Appl. No.: 17/414,006

(22) PCT Filed: Dec. 24, 2019

(86) PCT No.: PCT/KR2019/018419
§ 371 (c)(1),
(2) Date: Jun. 15, 2021

(87) PCT Pub. No.: WO2020/138930
PCT Pub. Date: Jul. 2, 2020

(65) Prior Publication Data

US 2022/0044832 A1 Feb. 10, 2022

(30) Foreign Application Priority Data

Dec. 26, 2018 (KR) ........................ 10-2018-0169183

(51) Int. Cl.
*G21D 1/00* (2006.01)
*G21C 1/08* (2006.01)

(52) U.S. Cl.
CPC ............ *G21D 1/003* (2013.01); *G21C 1/086* (2013.01)

(58) Field of Classification Search
CPC ................................ G21D 1/003; G21C 1/086
See application file for complete search history.

(56) References Cited

U.S. PATENT DOCUMENTS 3,158,544 A * 11/1964 Jerkins .................. G21C 19/02 376/269
3,755,079 A * 8/1973 Weinstein ............. G21C 13/00 976/DIG. 293
5,239,564 A * 8/1993 Jacquier .................... G21F 9/30 83/930

(Continued)

FOREIGN PATENT DOCUMENTS

DE 19610102 7/1997
EP 0466533 1/1992

(Continued)

OTHER PUBLICATIONS

Machine Translation of WO-9422594-A2.*

(Continued)

*Primary Examiner* — Lily C Garner
(74) *Attorney, Agent, or Firm* — LEX IP MEISTER, PLLC

(57) ABSTRACT

A method for decommissioning a nuclear facility includes: floating a nuclear reactor pressure vessel above a cavity; positioning a mounting device on bio-protective concrete to cover the cavity with the mounting device; mounting a lower portion of the nuclear reactor pressure vessel on the mounting device; and cutting and decommissioning the nuclear reactor pressure vessel mounted on the mounting device.

8 Claims, 10 Drawing Sheets

(56) References Cited

U.S. PATENT DOCUMENTS

| | | | | | |
|---|---|---|---|---|---|
| 5,293,412 | A * | 3/1994 | Jacquier | G21D 1/003 | 83/930 |
| 5,970,109 | A * | 10/1999 | Meier-Hynek | G21C 19/207 | 376/262 |
| 6,452,993 | B1 * | 9/2002 | Aoki | G21D 1/003 | 376/268 |
| 6,731,715 | B2 * | 5/2004 | Aoki | G21D 1/00 | 376/262 |
| 8,411,813 | B2 | 4/2013 | Aoki | | |
| 8,873,696 | B2 * | 10/2014 | Heim | G21D 3/00 | 376/263 |
| 2016/0125964 | A1 * | 5/2016 | Liszkai | G21D 1/00 | 376/277 |
| 2017/0098484 | A1 * | 4/2017 | Lessard | G21F 9/301 | |
| 2022/0044832 | A1 * | 2/2022 | Hwang | G21D 1/003 | |
| 2022/0139583 | A1 * | 5/2022 | Yoon | G21D 1/003 | 376/260 |
| 2022/0165439 | A1 * | 5/2022 | Hwang | G21F 9/28 | |
| 2022/0165440 | A1 * | 5/2022 | Hwang | G21F 9/28 | |

FOREIGN PATENT DOCUMENTS

| | | | | |
|---|---|---|---|---|
| FR | 2743445 | A1 * | 7/1997 | G21C 19/34 |
| FR | 2917154 | A1 * | 12/2008 | F22B 37/007 |
| GB | 1033046 | A * | 6/1966 | |
| JP | S60-24498 | A * | 2/1985 | |
| JP | 01185484 | A * | 7/1989 | |
| JP | H06102398 | A * | 4/1994 | |
| JP | 06-230188 | | 8/1994 | |
| JP | H06-230188 | * | 8/1994 | G21F 9/30 |
| JP | 1995-218696 | | 8/1995 | |
| JP | 11-248888 | | 9/1999 | |
| JP | 2000-506978 | | 6/2000 | |
| JP | 2000206294 | A * | 7/2000 | G21D 1/003 |
| JP | 2006098165 | A * | 4/2006 | |
| JP | 2011163880 | A * | 8/2011 | |
| JP | 4850214 | | 1/2012 | |
| KR | 10-2014-0048339 | | 4/2014 | |
| KR | 10-1522224 | | 5/2015 | |
| KR | 101522224 | B1 * | 5/2015 | |
| KR | 101754538 | B1 * | 7/2017 | |
| WO | WO-9422594 | A2 * | 10/1994 | B05B 3/001 |
| WO | WO-2020167043 | A1 * | 8/2020 | G21C 13/02 |
| WO | WO-2020184897 | A1 * | 9/2020 | G21D 1/003 |

OTHER PUBLICATIONS

Machine Translation of JP H06-230188.*

EPO, the extended European Search Report of the corresponding European Patent Application No. 19902864.8. dated Sep. 13, 2022.

* cited by examiner

METHOD FOR DECOMMISSIONING NUCLEAR FACILITY

TECHNICAL FIELD

The present disclosure relates to a method for decommissioning a nuclear facility.

BACKGROUND ART

Generally, among nuclear facilities used for nuclear power generation, a pressurized water reactor type of nuclear power plant includes a nuclear reactor pressure vessel and bio-protective concrete for surrounding the nuclear reactor pressure vessel.

When decommissioning a nuclear facility, it is necessary to separate the nuclear reactor pressure vessel from the bio-protective concrete, and to cut and decommission the nuclear reactor pressure vessel.

DISCLOSURE

Technical Problem

An embodiment is to provide a method for decommissioning a nuclear facility that easily cuts and decommissions a nuclear reactor pressure vessel separated from bio-protective concrete.

Technical Solution

An embodiment provides a method for decommissioning a nuclear facility that includes a nuclear reactor pressure vessel and bio-protective concrete including a cavity in which the nuclear reactor pressure vessel is positioned, including: floating the nuclear reactor pressure vessel above the cavity; positioning a mounting device on the bio-protective concrete to cover the cavity with the mounting device; mounting a lower portion of the nuclear reactor pressure vessel on the mounting device; and cutting and decommissioning the nuclear reactor pressure vessel mounted on the mounting device.

The mounting device may include a mounting portion corresponding to a lower portion of the nuclear reactor pressure vessel.

The mounting portion may include a curved surface.

The mounting portion may include a step-like surface.

The mounting device may further include a through-hole penetrating a center of the mounting portion.

The mounting device may further include an elastic coating layer coated on a surface of the mounting portion.

The nuclear facility may further include a plurality of pipes directly connected to the nuclear reactor pressure vessel, and the method may further include: expanding an inner wall of the bio-protective concrete forming the cavity; and separating the plurality of pipes from the nuclear reactor pressure vessel.

The nuclear facility may further include a crane positioned on the bio-protective concrete, and the floating of the nuclear reactor pressure vessel above the cavity may be performed by lifting the nuclear reactor pressure vessel from the bio-protective concrete by using the crane.

Advantageous Effects

According to the embodiment, a method for decommissioning a nuclear facility that easily cuts and decommissions a nuclear reactor pressure vessel separated from a bio-protective concrete, is provided.

MODE FOR INVENTION

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

In addition, unless explicitly described to the contrary, the word “comprise” and variations such as “comprises” or “comprising” will be understood to imply the inclusion of stated elements but not the exclusion of any other elements.

Hereinafter, a method for decommissioning a nuclear facility according to an embodiment will be described with reference to FIG. 1 to FIG. 10.

Hereinafter, a pressurized water reactor (PWR) type of nuclear power plant will be exemplified as the nuclear facility, and without being limited to this, the nuclear facility may be a boiling water reactor (BWR) type of nuclear power plant.

The pressurized water reactor type of nuclear power plant uses light-water as a coolant and moderator, and uranium 235 is concentrated to about 2% to 4% to be used as nuclear fuel. A pressurized light-water reactor type of nuclear power plant is divided into a facility related to a nuclear reactor system that transmits heat generated by nuclear fission within a reactor to a steam generator for heat exchange; and a facility related to a turbine and generator system that turns a turbine with steam generated from the steam generator, returns it to water through a condenser, and then circulates it back to the steam generator.

Generally, a coolant (light water), which is a heat transfer medium of a nuclear reactor system, is heated to about 320° C. in a nuclear reactor and pressurized to about 153 atmospheres so that it does not boil. Equipment configuring the system includes a pressurizer that adjusts pressure to maintain constant enthalpy, and a coolant pump that circulates the coolant between the reactor and the steam generator. A system in which the steam generated from the steam generator rotates the turbine to generate power from a generator connected to a turbine shaft may be the same as that of a general thermal power plant.

Figure 1:
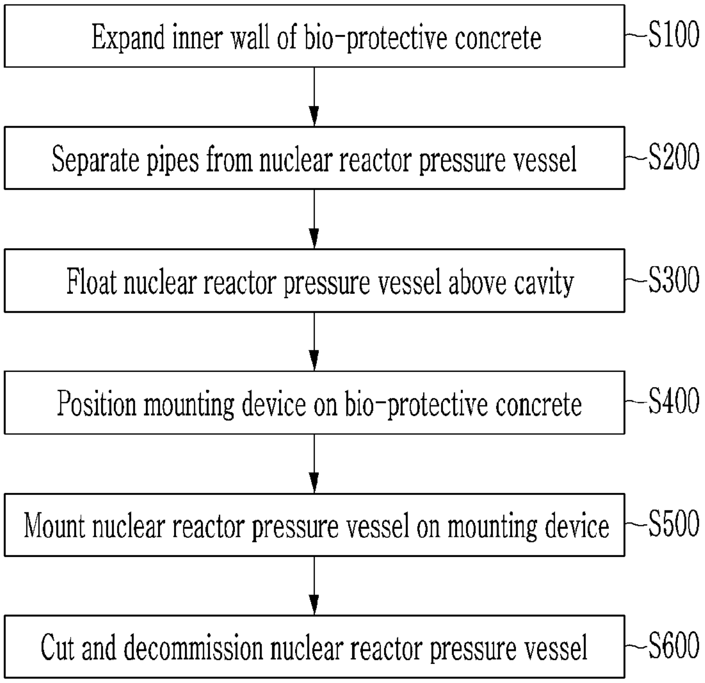
FIG. 1 illustrates a flowchart of a method for decommissioning a nuclear facility according to an embodiment.

FIG. 1 illustrates a flowchart of a method for decommissioning a nuclear facility according to an embodiment.

FIG. 2 to FIG. 10 are drawings for explaining a method for decommissioning a nuclear facility according to an embodiment.

Figure 2:
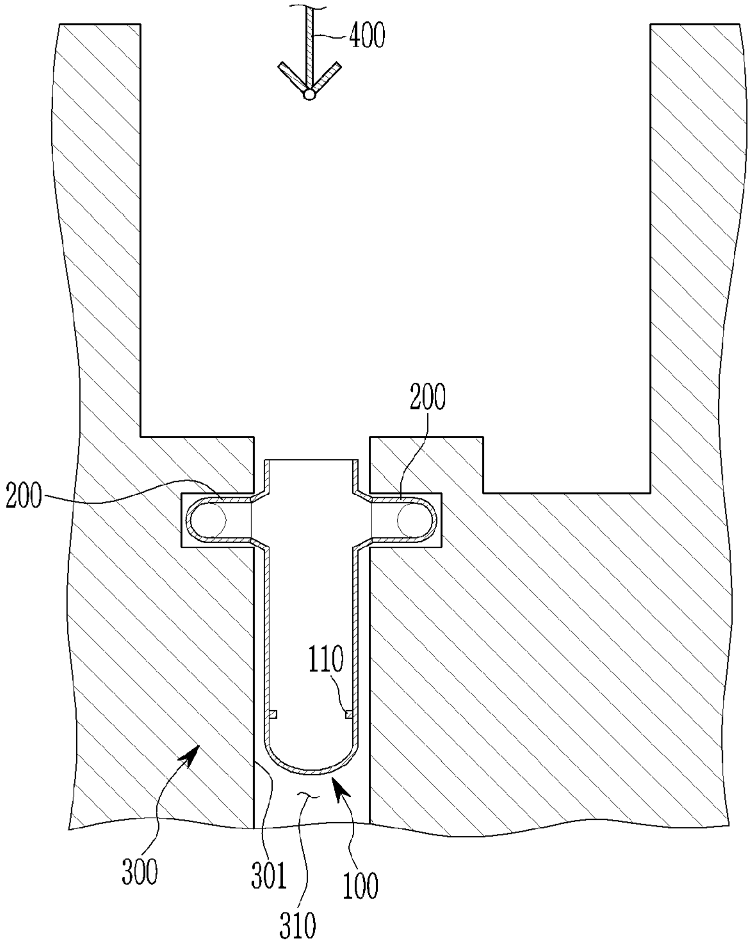
FIG. 2 to FIG. 10 are drawings for explaining a method for decommissioning a nuclear facility according to an embodiment.
Figure 3:
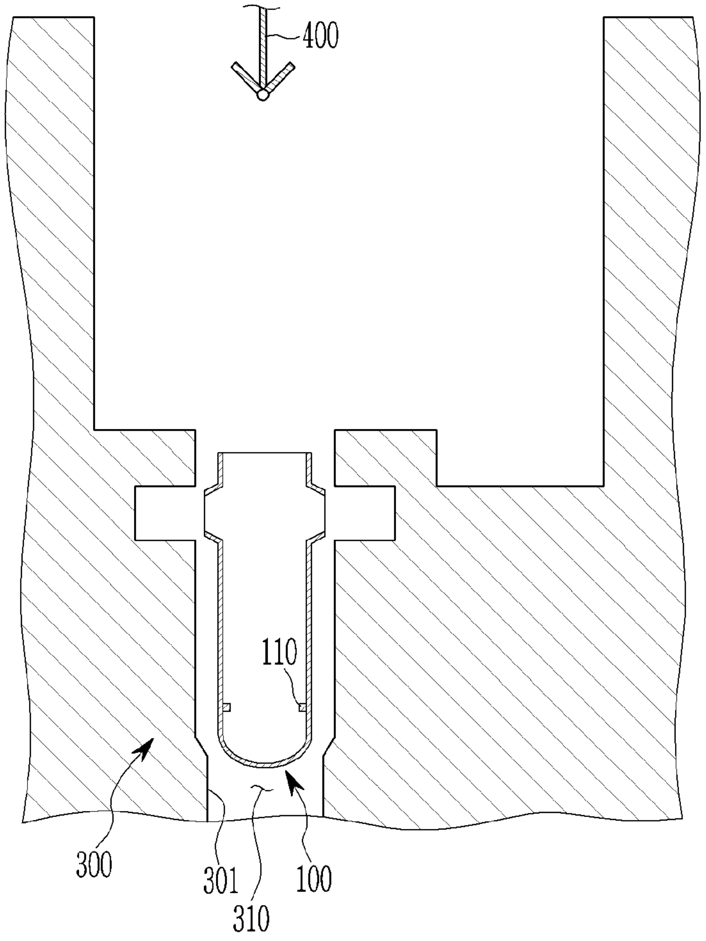

First, referring to FIG. 1 to FIG. 3, an inner wall 301 of a bio-protective concrete 300 is expanded (S100).

FIG. 2 is a drawing of a part of a nuclear facility.

Specifically, referring to FIG. 2, the nuclear facility includes a nuclear reactor pressure vessel 100, a plurality of pipes 200 directly connected to the nuclear reactor pressure vessel 100, bio-protective concrete 300 surrounding the nuclear reactor pressure vessel 100 and the pipes 200 and supporting the nuclear reactor pressure vessel 100, and a crane 400. The nuclear facility may further include various known configurations in addition to the configurations shown in FIG. 2.

The nuclear reactor pressure vessel 100 may be a pressurized water reactor type, but is not limited thereto. For example, the nuclear reactor pressure vessel 100 may be a boiling water reactor type. A protrusion 110 supporting various known types of cores protrudes from an inner wall of the nuclear reactor pressure vessel 100.

The plurality of pipes 200 are connected to various types of known steam generators. Hot water may pass through one of the pipes 200, and cold water may pass through the other pipe thereof, but the present invention is not limited thereto.

The bio-protective concrete 300 includes a cavity 310 in which the nuclear reactor pressure vessel 100 is positioned, and the inner wall 301 forming the cavity 310 and facing the nuclear reactor pressure vessel 100.

The crane 400 is positioned above the bio-protective concrete 300. The crane 400 may be a crane 400 used during an initial installation of the nuclear facility, but is not limited thereto.

FIG. 3 illustrates a state in which the inner wall of the bio-protective concrete is expanded and the pipes are separated from the nuclear reactor pressure vessel in the nuclear facility shown in FIG. 2.

Referring to FIG. 2 and FIG. 3, the inner wall 301 of the bio-protective concrete slab 300 forming the cavity 310 is cut and expanded by using a cutting member such as a wire saw or a circular saw. In FIG. 3, a portion of the inner wall 301 corresponding to the nuclear reactor pressure vessel 100 is expanded, but the present invention is not limited thereto, and a portion of the inner wall 301 corresponding to an upper portion of the pipes 200 may be expanded.

As the inner wall 301 of the bio-protective concrete 300 is expanded, the pipes 200 are exposed in an upper direction.

Meanwhile, before expanding the inner wall 301 of the bio-protective concrete 300, insulation surrounding the nuclear reactor pressure vessel 100 may be removed.

Next, the pipes 200 are separated from the nuclear reactor pressure vessel 100 (S200).

Specifically, the pipes 200 exposed through the expanded inner wall 301 of the bio-protective concrete 300 are cut in a diameter direction of the pipes 200, and the pipes 200 are separated from the nuclear reactor pressure vessel 100.

The cutting of the pipes 200 may be performed by using a wire saw, but is not limited thereto, and may be performed by using another cutting member such as a circular saw.

Since the pipes 200 are completely exposed through the expanded inner wall 301, the pipes 200 may be easily cut through the expanded inner wall 301 by using a cutting member.

Figure 4:
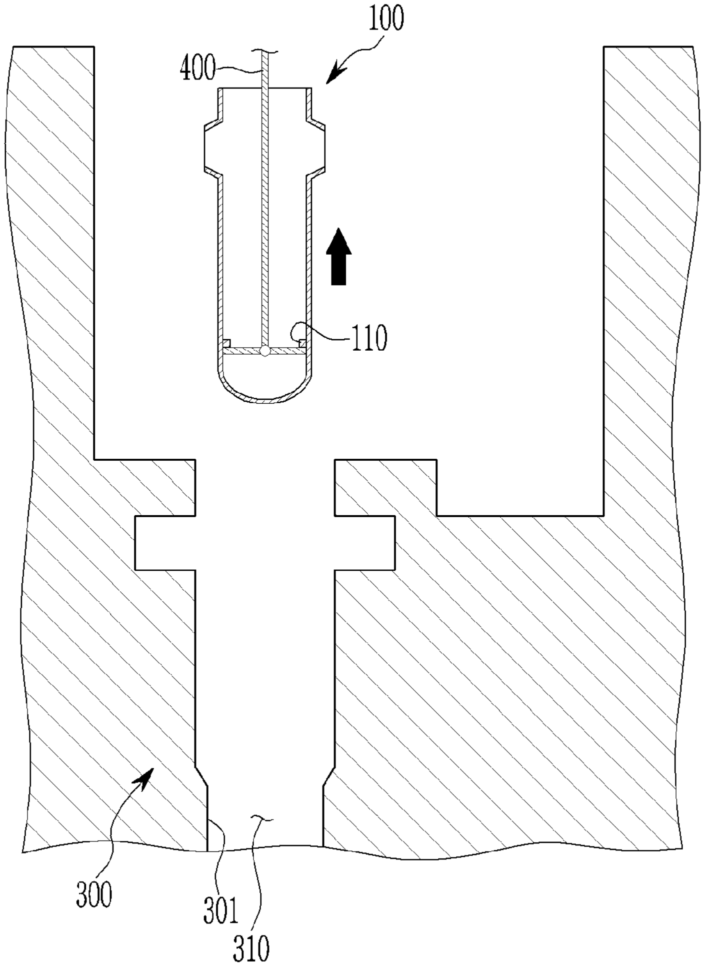

FIG. 4 is a drawing in which the nuclear reactor pressure vessel is floating above the cavity in the nuclear facility shown in FIG. 3.

Referring to FIG. 4, the nuclear reactor pressure vessel 100 is floating above the cavity 310 (S300).

Specifically, the nuclear reactor pressure vessel 100, whose pipes are cut through the expanded inner wall 301 of the bio-protective concrete 300, is lifted from the bio-protective concrete 300 by using the crane 400 to be floating above the cavity 310 of the bio-protective concrete slab 300. In this case, the crane 400 may support the protrusion 110 protruding on the inner wall of the nuclear reactor pressure vessel 100 to lift the nuclear reactor pressure vessel 100 from the bio-protective concrete 300, but is not limited thereto.

For example, the crane 400 may support an upper portion of the nuclear reactor pressure vessel 100 to lift the nuclear reactor pressure vessel 100 from the bio-protective concrete 300.

Since the pipes connected to the nuclear reactor pressure vessel 100 are cut and separated through the expanded inner wall 301, the nuclear reactor pressure vessel 100 may be easily lifted from the bio-protective concrete 300 without interference by the bio-protective concrete 300 and the pipes.

Figure 5:
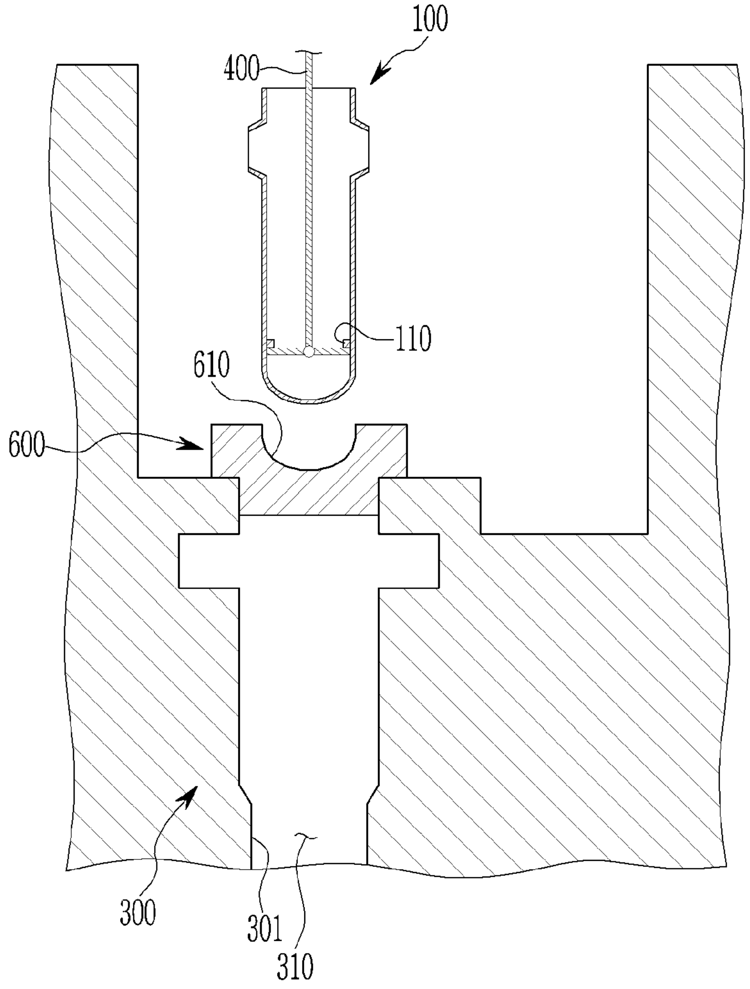

FIG. 5 is a drawing in which a mounting device is positioned on the cavity of the bio-protective concrete in the nuclear facility shown in FIG. 4.

Referring to FIG. 5, a mounting device 600 is positioned on the bio-protective concrete 300 (S400).

Specifically, by positioning the mounting device 600 on the bio-protective concrete 300, the cavity 310 is covered with the mounting device 600.

By positioning the mounting device 600 between the cavity 310 of the bio-protective concrete 300 and the floating nuclear reactor pressure vessel 100, the cavity 310 is covered with the mounting device 600.

The mounting device 600 includes a mounting portion 610 corresponding to a lower portion of the nuclear reactor pressure vessel 100. The mounting portion 610 includes a curved surface corresponding to the lower portion of the nuclear reactor pressure vessel 100. The curved surface of the mounting portion 610 may have substantially the same curvature as that of the lower portion of the nuclear reactor pressure vessel 100.

Meanwhile, in another embodiment, the curvature of the curved surface of the mounting portion 610 may be larger or smaller than that of the lower portion of the nuclear reactor pressure vessel 100.

Figure 6:
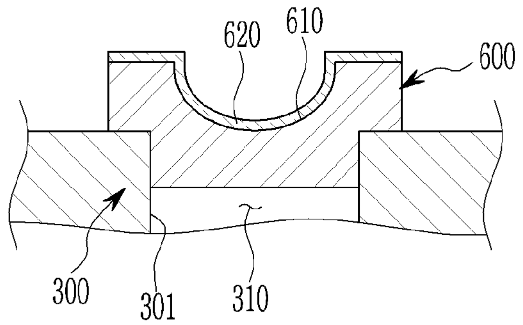

FIG. 6 illustrates an example of the mounting device shown in FIG. 5.

Referring to FIG. 6, the mounting device 600 includes the mounting portion 610 and an elastic coating layer 620.

The elastic coating layer 620 is coated on a surface of the mounting portion 610. The elastic coating layer 620 may extend from the surface of the mounting portion 610 to the upper surface of the mounting device 600.

Meanwhile, the elastic coating layer 620 may be coated on the entire surface of the mounting device 600.

The elastic coating layer 620 may include a polymer. For example, the elastic coating layer 620 may include a polymer such as rubber and urethane, but is not limited thereto, and may include various known materials having elasticity.

Figure 7:
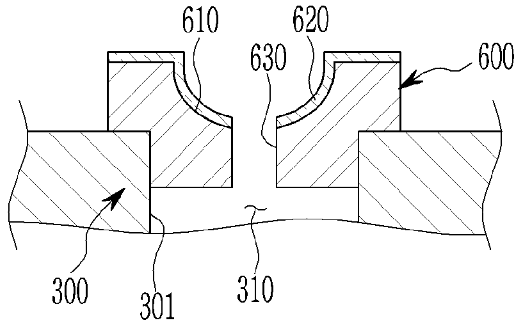

FIG. 7 illustrates another example of the mounting device shown in FIG. 5.

Referring to FIG. 7, the mounting device 600 includes the mounting portion 610, the elastic coating layer 620, and a through-hole 630.

The elastic coating layer 620 is coated on the surface of the mounting portion 610. The elastic coating layer 620 may extend from the surface of the mounting portion 610 to the upper surface of the mounting device 600.

Meanwhile, the elastic coating layer 620 may be coated on the entire surface of the mounting device 600.

The elastic coating layer 620 may include a polymer. For example, the elastic coating layer 620 may include a polymer such as rubber and urethane, but is not limited thereto, and may include various known materials having elasticity.

The through-hole 630 penetrates a center of the mounting portion 610. The through-hole 630 communicates with the cavity 310 of the bio-protective concrete 300. The through-hole 630 may be circular in a plan view, and thus, the mounting device 600 may have a donut shape in a plan view.

Figure 8:
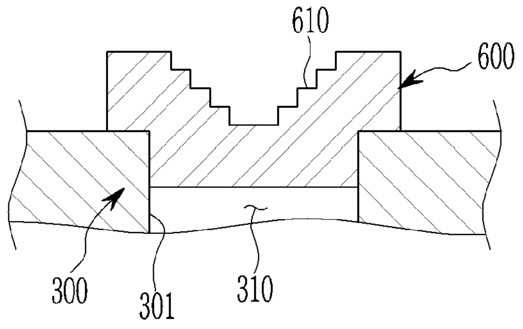

FIG. 8 illustrates another example of the mounting device shown in FIG. 5.

Referring to FIG. 8, the mounting device 600 includes the mounting portion 610 corresponding to the lower portion of the nuclear reactor pressure vessel 100. The mounting portion 610 includes a step-like surface corresponding to the lower portion of the nuclear reactor pressure vessel 100.

Corners of steps forming the step-like surface of the mounting portion 610 may be disposed on an imaginary line having substantially the same curvature as the curvature of the lower portion of the nuclear reactor pressure vessel 100.

Figure 9:
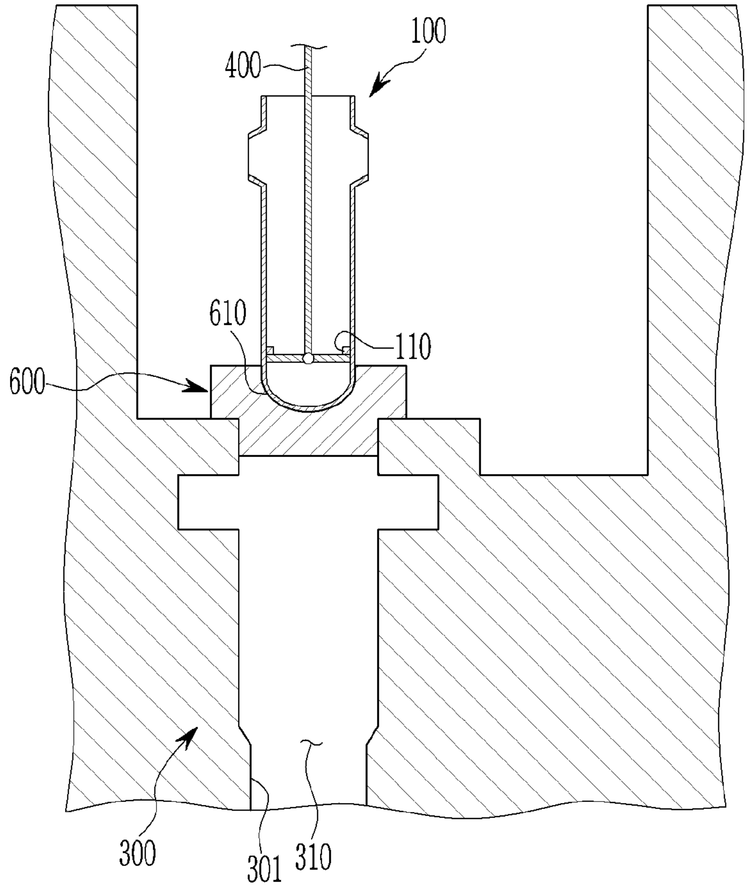

FIG. 9 is a drawing in which the nuclear reactor pressure vessel is mounted on the mounting device in the nuclear facility shown in FIG. 5.

Next, referring to FIG. 9, the nuclear reactor pressure vessel 100 is mounted on the mounting device 600 (S500).

Specifically, the lower portion of the nuclear reactor pressure vessel 100 is mounted on the mounting portion 610 of the mounting device 600 that covers the cavity 310 of the bio-protective concrete 300 by using the crane 400.

The mounting portion 610 of the mounting device 600 contacts the lower portion of the nuclear reactor pressure vessel 100 to support the nuclear reactor pressure vessel 100.

As the mounting device 600 supports the lower portion of the nuclear reactor pressure vessel 100, the nuclear reactor pressure vessel 100 is supported on the cavity 310 of the bio-protective concrete 300 without shaking.

Figure 10:
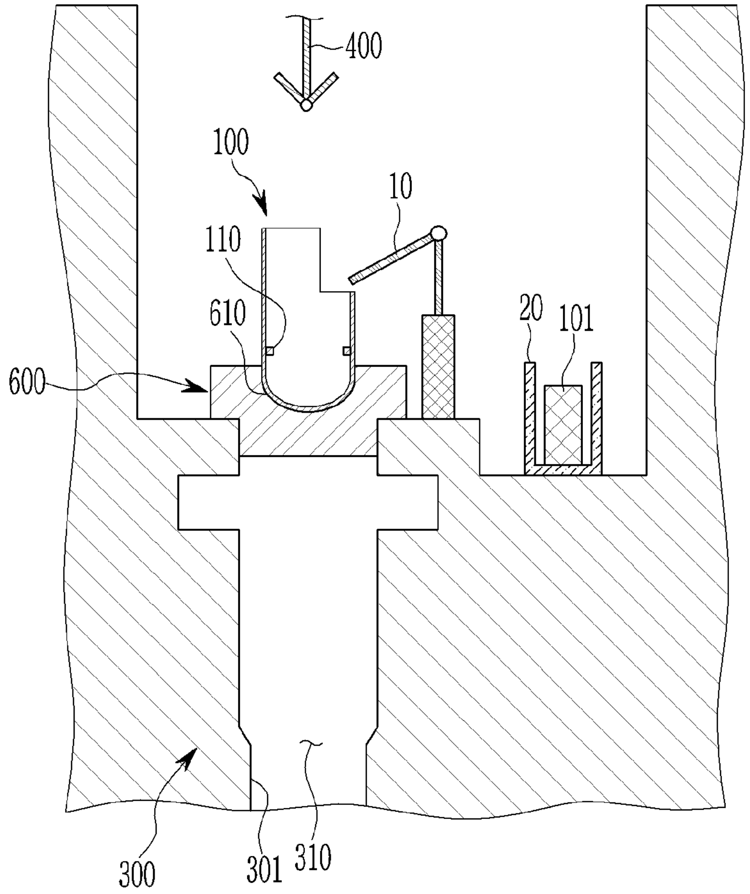

FIG. 10 is a drawing in which the nuclear reactor pressure vessel mounted on the mounting device in the nuclear facility shown in FIG. 9 is partially cut and decommissioned by using a cutting device.

Next, referring to FIG. 10, the nuclear reactor pressure vessel 100 is cut and decommissioned (S600).

Specifically, the nuclear reactor pressure vessel 100 mounted on the mounting device 600 is cut and decommissioned.

The nuclear reactor pressure vessel 100 supported by the mounting device 600 that covers the cavity 310 of the bio-protective concrete 300 is cut and decommissioned from the upper portion to the lower portion of the reactor pressure vessel 100 by using a cutting device 10 installed on the bio-protective concrete 300, so that the nuclear reactor pressure vessel 100 may be cut and decommissioned.

The cutting device 10 may include an end effector including a cutting member such as a laser cutter and a grip member such as a gripper. The cutting device 10 may allow a pressure vessel piece 101 cut and decommissioned from the nuclear reactor pressure vessel 100 to be stored in a standard size of packaging container 20. The packaging container 20 in which the pressure vessel piece 101 is stored may be sealed and taken out of the nuclear facility.

The cutting and decommissioning of the nuclear reactor pressure vessel 100 using the cutting device 10 may be performed in the state in which the crane 400 is separated from the nuclear reactor pressure vessel 100, but is not limited thereto, and may be performed in a state in which the crane 400 supports the nuclear reactor pressure vessel 100.

Next, after the nuclear reactor pressure vessel 100 is cut and decommissioned, the bio-protective concrete 300 may be cut and decommissioned.

The bio-protective concrete 300 may be cut and decommissioned by using various known cutting members.

As described above, according to the method for decommissioning the nuclear facility of the embodiment, since the nuclear reactor pressure vessel 100 is separated from the cavity 310 of the bio-protective concrete 300 and it is not cut or disassembled after being moved to another place, but the nuclear reactor pressure vessel 100 is mounted on the mounting device 600 covering the cavity 310 of the bio-protective concrete 300 and then it is cut and decommissioned, it is easy to use the space for cutting and decommissioning the nuclear reactor pressure vessel 100. This serves as a factor to reduce a total decommissioning time and decommissioning cost of the nuclear facility.

That is, the method for dismantling the nuclear facility is provided that easily cuts and decommissions the nuclear reactor pressure vessel 100 separated from the bio-protective concrete 300.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

The invention claimed is:

1. A method for decommissioning a nuclear facility that includes a nuclear reactor pressure vessel and bio-protective concrete including a cavity in which the nuclear reactor pressure vessel is positioned, comprising:

lifting up an entirety of the nuclear reactor pressure vessel above the cavity from the cavity;

positioning a mounting device directly on the bio-protective concrete to cover the cavity with the mounting device;

mounting the entirety of the nuclear reactor pressure vessel directly on the mounting device, thereby a lower portion of the nuclear reactor pressure vessel being supported by the mounting device; and cutting and decommissioning the nuclear reactor pressure vessel mounted on the mounting device which is positioned on the bio-protective concrete to cover the cavity.

2. The method for decommissioning the nuclear facility of claim 1, wherein the mounting device includes a mounting portion contacting the lower portion of the nuclear reactor pressure vessel.

3. The method for decommissioning the nuclear facility of claim 2, wherein the mounting portion includes a curved surface.

4. The method for decommissioning the nuclear facility of claim 2, wherein the mounting portion includes a stepped surface.

5. The method for decommissioning the nuclear facility of claim 2, wherein the mounting portion further includes a through-hole penetrating a center of the mounting portion.

6. The method for decommissioning the nuclear facility of claim 2, wherein the mounting device further includes an elastic coating layer coated on a surface of the mounting portion.

7. The method for decommissioning the nuclear facility of claim 1, wherein the nuclear facility further includes a plurality of pipes directly connected to the nuclear reactor pressure vessel, and the method further includes: expanding an inner wall of the bio-protective concrete forming the cavity; and separating the plurality of pipes from the nuclear reactor pressure vessel.

8. The method for decommissioning the nuclear facility of claim 1, wherein the nuclear facility further includes a crane positioned on the bio-protective concrete, and the lifting of the entirety of the nuclear reactor pressure vessel above the cavity is performed by the crane.

* * * * *